US012756196B2

(12) United States Patent
Gao et al.

(10) Patent No.: US 12,756,196 B2
(45) Date of Patent: Oct. 6, 2026

(54) SYSTEM AND METHOD FOR OPTIMAL POWER GRID REACTIVE RESOURCE SWITCHING

(71) Applicant: AspenTech Corporation, Bedford, MA (US)

(72) Inventors: Baofu Gao, Minnetonka, MN (US); John Wroblewski, Edina, MN (US); Wei Feng, Plymouth, MN (US); Roopa Akkala, Medina, MN (US); Samuel Handler, Minnetonka, MN (US); Hrishikesh Ramesh, Dayton, MN (US)

(73) Assignee: AspenTech Corporation, Bedford, MA (US)

( * ) Notice: Subject to any disclaimer, the term of this patent is extended or adjusted under 35 U.S.C. 154(b) by 205 days.

(21) Appl. No.: 18/643,739

(22) Filed: Apr. 23, 2024

(65) Prior Publication Data

US 2025/0253659 A1 Aug. 7, 2025

Related U.S. Application Data

(60) Provisional application No. 63/549,001, filed on Feb. 2, 2024.

(51) Int. Cl.
*H02J 3/1821* (2026.01)
*H02J 103/30* (2026.01)
*H02J 103/35* (2026.01)

(52) U.S. Cl.
CPC ......... *H02J 3/1821* (2013.01); *H02J 2103/30* (2026.01); *H02J 2103/35* (2026.01)

(58) Field of Classification Search
CPC ... H02J 3/1821; H02J 2103/30; H02J 2103/35
(Continued)

(56) References Cited

U.S. PATENT DOCUMENTS

2012/0179301 A1* 7/2012 Aivaliotis ................. H02J 3/00 700/286
2022/0294217 A1* 9/2022 Spalt ....................... H02J 3/003

FOREIGN PATENT DOCUMENTS

EP 4513397 A1 * 2/2025 ......... G06Q 10/0631
WO 2025/165552 A1 8/2025

OTHER PUBLICATIONS

Kono et al. "A new Monitoring and Control Method for improving Voltage Stability Margin" 2022 IEEE PES Innovative Smart Grid Technologies—Asia (ISGT Asia), IEEE, Nov. 1, 2022, pp. 21-25. Nov. 11, 2022.*

(Continued)

*Primary Examiner* — Yemane Mehari
(74) *Attorney, Agent, or Firm* — Hamilton, Brook, Smith & Reynolds, P.C.

(57) ABSTRACT

A computer method and system determine the reactive resources to be switched to keep voltage at key points in a power grid within their allowed high and low limits. The method periodically runs power flow for each of plural time intervals from a current time interval to a future time interval. Asynchronously and in concert with running the power flow, the method periodically formulates and solves a representative mixed integer linear programming (MILP) optimization problem for maintaining voltage within limits of interest, resulting in an optimal reactive resource switching solution. Based on the optimal reactive resource switching solution, the method provides at least one output toward switching in/out reactive resources of a subject power grid. The method and system achieve real-time, multi-interval optimal reactive power dispatching.

27 Claims, 10 Drawing Sheets

(58) Field of Classification Search
USPC .......................................................... 323/205
See application file for complete search history.

(56) References Cited

OTHER PUBLICATIONS

International search Report and written opinion received for PCT application No. PCT/US2025/011228, mailed on Apr. 28, 2025, 16 pages.
Nono et al., "A New Monitoring and Control Method for Improving Voltage Stability Margin", 2022 IEEE PES Innovative Smart Grid Technologies—Asia (ISGT Asia), Nov. 1, 2022, pp. 21-25.
Rahimi et al., "Coordinated closed-loop voltage control by using a real-time Volt/VAR Optimization function for MV distribution Networks", 2015 IEEE 15th International Conference on Environment and Electrical Engineering (EEEIC), Jun. 10, 2015, pp. 1222-1228.
Ibrahim, et al., "Alternating Optimization Approach for Voltage-Secure Multi-Period Optimal Reactive Power Dispatch," IEEE Transactions on Power Systems, Sep. 2022.

* cited by examiner

SYSTEM AND METHOD FOR OPTIMAL POWER GRID REACTIVE RESOURCE SWITCHING

RELATED APPLICATION

This application claims the benefit of U.S. Provisional Application No. 63/549,001, filed on Feb. 2, 2024. The entire teachings of the above application are incorporated herein by reference.

BACKGROUND

Mixed-integer linear programming (MILP) can be used for system analysis and optimization as it presents a flexible and powerful method for solving large, complex problems such as the case with industrial symbiosis and process integration.

SUMMARY

Keeping voltage at key points in a power grid within the acceptable range is important for reliability and customer satisfaction of power transmission companies. This is of increasing importance as more renewable power is introduced to reduce the carbon emission because renewable power, such as wind and solar generation for non-limiting examples, is less controllable and does not provide as good reactive power support as traditional synchronous generators. A computer-implemented method and computer-based system disclosed herein may determine reactive resources to be switched in the power grid to keep voltage at key points, such as key power supply points, within their allowed (acceptable) high and low limits. The method may be based on a combination of power flows, mixed integer linear programming (MILP) optimization to achieve an objective of minimizing a number of reactive resource switches, subject to the constraints of key point voltages being within allowed ranges, and an optional fallback rule-based process. The method (process) results may be used to switch reactive resources in the power grid, that is, "in the field." System responses to the switching action(s) performed in a current control cycle may be fed back as input to a next control cycle forming a robust iterative process until stable optimal operations are achieved. The method and system achieve real-time, multi-interval optimal reactive power dispatching.

According to an example embodiment, a computer-based system for power grid reactive resource switching comprises at least one processor configured to execute, asynchronously, a monitoring process and a decision-maker process working in concert resulting in optimal reactive resource switching in a power grid. The monitoring process is configured to periodically run power flow for each of plural time intervals from a current time interval to a future time interval. The decision-maker process is configured to periodically formulate and solve a representative MILP optimization problem over the plural time intervals for maintaining voltage within limits of interest. The computer-based system further comprises an output interface responsive to results of the decision-maker process, and communicatively coupled to provide at least one output toward the power grid switching in/out reactive resources. The at least one output provided is based on the results.

In instances where the MILP optimization problem fails to solve, the decision-maker process may be further configured to employ a fallback rule-based method for maintaining voltage close to within the limits of interest.

The output interface may be configured to provide the at least one output in a manner that enables real-time, multi-interval optimal reactive power dispatching in the power grid.

The at least one output may include at least one control command configured to effectuate at least one field device of the power grid to switch in/out at least one reactive resource of the reactive resources.

The at least one output may include at least one representation of one or more recommendations for at least one field device of the power grid to switch in/out at least one reactive resource of the reactive resources.

The results may represent at least one control for switching in/out the reactive resources in a given time interval of the plural time intervals. For example, it is possible that no control action needs to be sent in a present time interval as the results may indicate that such control action is for a given time interval that is in the future relative to the present time interval. The monitoring process may be further configured to periodically monitor at least one parameter of the power grid and identify at least one voltage outside of the limits of interest at a respective point of interest in the power grid based on the at least one parameter monitored. The decision-maker process may be further configured to converge on the at least one control to resolve the at least one voltage identified as outside of the limits of interest. The decision-maker process may be further configured to converge by periodically formulating and solving the representative MILP optimization problem and, in instances where the representative MILP optimization problem fails to solve, the decision-maker process may be further configured to employ a fallback rule-based method for maintaining voltage close (e.g., within a defined tolerance) to within the limits of interest.

The at least one output may be based on the at least one control converged on by the decision-maker process. The respective point of interest may be identified via an engineering process, for non-limiting example.

The monitoring process may be further configured to identify the at least one voltage outside of the limits of interest based on a non-linear model of an operative state of the power grid.

The at least one control converged on by the decision-maker process may represent at least one reactive resource to be switched in/out (meaning, switched in or switched out) of the power grid to resolve the at least one voltage outside of the limits of interest in the current time interval or at least one future time interval of the plural time intervals.

The at least one parameter monitored may include at least one measurement value sourced by at least one field device of the power grid.

The decision-maker process may be further configured to employ a linear approximation of a model of an operative state of the power grid.

The monitoring process and the decision-maker process may be configured to work in concert over the plural time intervals to converge on controls for switching in/out the reactive resources to achieve the optimal reactive resource switching in the power grid. As used herein, 'switching in/out' may mean switching in one or more reactive resources, or switching out said reactive resources, or a combination of switching in some reactive resources while switching out other reactive resources.

The decision-maker process may be further configured to produce the results based on voltage value, equipment status, network connectivity status, power delivery information, or other operative condition for the power grid, or a combination thereof for non-limiting examples, in the current time interval and at least one future time interval of the plural time intervals.

The decision-maker process may be further configured to maintain voltages at points of interest in the power grid to be within respective voltage ranges via switching of reactive resources of the power grid and to minimize the reactive resource switching.

According to another example embodiment, a computer-implemented method for power grid reactive resource switching comprises periodically running power flow for each of plural time intervals from a current time interval to a future time interval. The computer-implemented method further comprises, asynchronously and in concert with running the power flow, periodically formulating and solving a representative mixed integer linear programming (MILP) optimization problem for maintaining voltage within limits of interest, resulting in an optimal reactive resource switching solution. The computer-implemented method further comprises, based on the optimal reactive resource switching solution, providing at least one output toward switching in/out reactive resources (switching in reactive resources, or switching out said reactive resources, or switching in some reactive resources while switching out other reactive resources) of a subject power grid.

Alternative computer-implemented method embodiments parallel those described above in connection with the example computer-based system embodiments.

According to another example embodiment, a non-transitory computer-readable medium for power grid reactive resource switching has encoded thereon a sequence of instructions which, when loaded and executed by at least one processor, causes the at least one processor to periodically run power flow for each of plural time intervals from a current time interval to a future time interval. The sequence of instructions further causes the at least one processor to asynchronously, and in concert with running the power flow, periodically formulate and solve a representative mixed integer linear programming (MILP) optimization problem for maintaining voltage within limits of interest, resulting in an optimal reactive resource switching solution. The sequence of instructions further causes the at least one processor, based on the optimal reactive resource switching solution, to provide at least one output toward switching in/out reactive resources of a subject power grid.

Alternative non-transitory computer-readable medium embodiments parallel those described above in connection with the example computer-based system embodiments.

It should be understood that example embodiments disclosed herein can be implemented in the form of a method, apparatus, system, or computer readable medium with program codes embodied thereon.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DESCRIPTION OF EXAMPLE EMBODIMENTS

Figure 1:
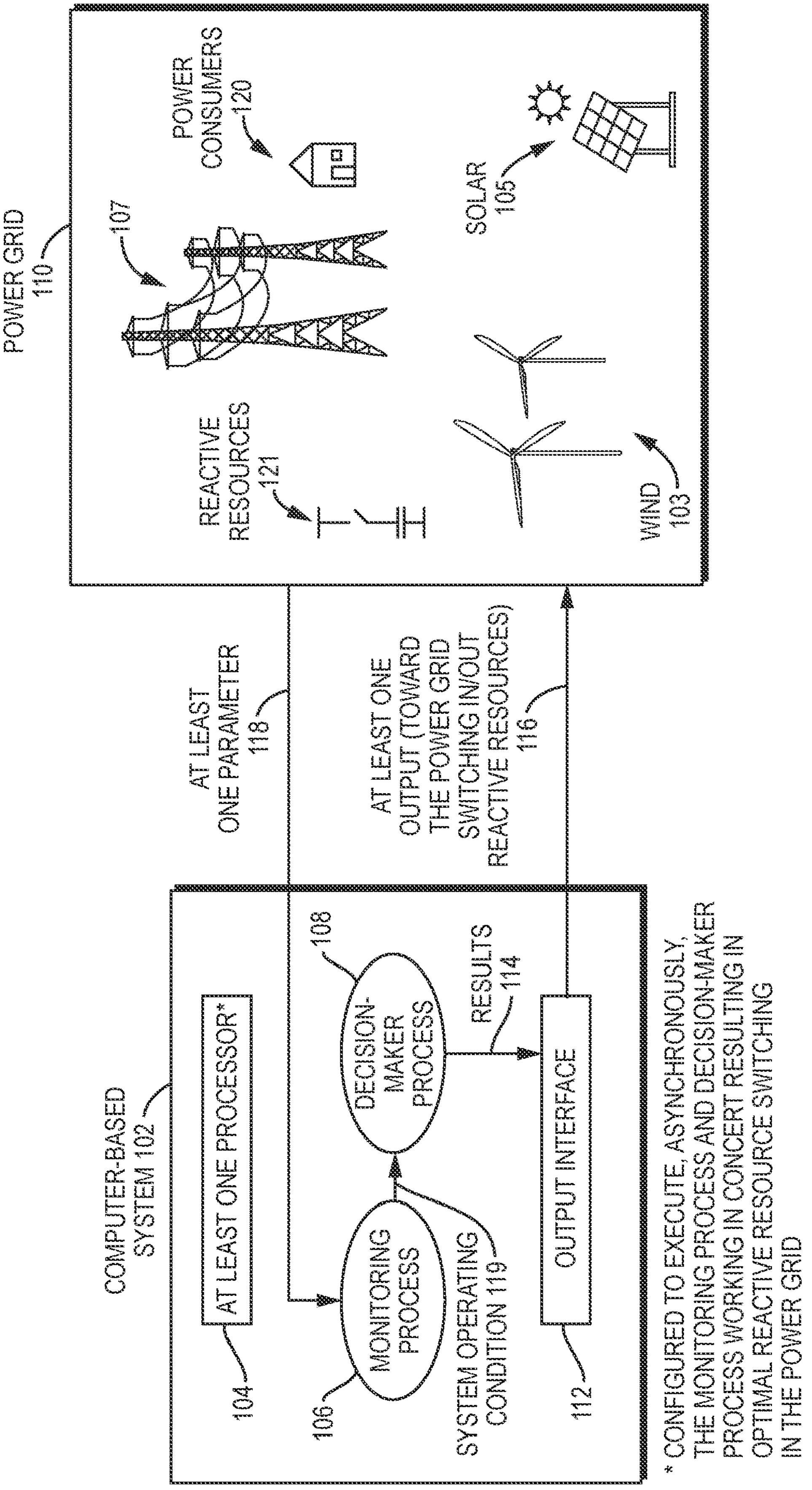
FIG. 1 is a block diagram of an example embodiment of a computer-based system for power grid reactive resource switching.

A description of example embodiments follows.

A voltage outside of limits of interest or outside of an acceptable (allowed) voltage range may be referred to interchangeably herein as a voltage limit violation or voltage violation. Such limits of interest and acceptable (allowed) voltage range may define a high voltage limit and a low voltage limit defined to be acceptable at a respective point of interest in a power grid.

A process may be referred to interchangeably herein as a method

A key point may be referred to interchangeably herein as a point of interest. Such a key point may be a power supply point (location) in a power grid that supplies a large amount of power to downstream components of the power grid relative to other power supply points of the power grid.

An example embodiment disclosed herein provides a practical method to determine reactive resources of a power grid, such as reactors and capacitors for non-limiting examples, to be switched to keep voltage at key points within the power grid within their allowed (acceptable) high and low limits for a current time and/or a period into the immediate future. An example embodiment of the method may be based on a combination of full alternating current (AC) power flows, mixed integer linear programming (MILP) optimization, and an optional fallback rule-based method. The results of an example embodiment of a method may be used to switch reactive resources of the power grid in the field. System responses to the switching action may be fed back as input to the next control cycle, forming a robust iterative process until stable optimal operations are achieved.

An example embodiment of a solution may involve two asynchronously executed processes, A and B, referred to interchangeably herein as a monitoring process and decision-maker process, respectively, working in concert to achieve a desired (target) optimal reactive resource switching configuration. An example embodiment may periodically run power flow for each of the time intervals from a current time to an end of an immediate future time of interest. This may be referred to as process A, that is, the monitoring process. An example embodiment of process B, that is, the decision-maker process may periodically formulate and solve a MILP problem to minimize a total number of switches and maintain voltage within an upper limit and lower limit, that is, within an acceptable voltage range. Optionally, a fallback rule-based method may be employed by the decision-maker process, that is, process B, in case MILP optimization fails to solve, to maintain voltage as close to within the limits as possible. According to an example embodiment, the decision-maker process may produce control commands for transmission to the field to switch in/out reactive resources (switch in certain reactive resources, or switch out the reactive resources, or a combination of switching in some specific reactive resources while switching out other reactive resources) as needed. An example embodiment of a computer-based system that may employ such a monitoring process (Process A) and decision-maker process (Process B) is disclosed below with regard to FIG. 1.

FIG. 1 is a block diagram of an example embodiment of a computer-based system 102 for power grid reactive resource switching. The computer-based system 102 may comprise at least one processor 104, such as the central processor unit (CPU) 904 disclosed below with regard to FIG. 9 for non-limiting example. Continuing with reference to FIG. 1, the at least one processor 104 may be configured to execute, asynchronously, a monitoring process 106 and a decision-maker process 108 working in concert resulting in optimal reactive resource switching in a power grid 110. The monitoring process 106 may be configured to periodically run power flow (not shown) for each of plural time intervals (not shown) from a current time interval (not shown) to a future time interval (not shown). The decision-maker process 108 may be configured to periodically formulate and solve a representative mixed integer linear programming (MILP) optimization problem (not shown) over the plural time intervals for maintaining voltage (not shown) within limits (not shown) of interest. The computer-based system 102 may further comprise an output interface 112 responsive to results 114 of the decision-maker process 108, and communicatively coupled to provide at least one output 116 toward the power grid 110 switching in/out reactive resources 121. The at least one output 116 provided is based on the results 114.

The computer-based system 102 may represent an iterative, real-time control system configured to maintain voltages at key power supply points of the power grid 110 within respective upper and lower voltage limits defined to be acceptable at such points.

The power grid 110 may be a network/system of power lines and associated equipment used to transmit and distribute electricity to customers over a geographic area (not shown). The power grid 110 may include power consumers 120, reactive resources 121, and renewable energy sources, such as wind 103 and solar 105 based energy sources, for non-limiting examples. The power grid 110 may include transmission lines 107 and other components as is known in the art.

The at least one output 116 may include at least one representation of one or more recommendations for at least one field device (not shown) of the power grid 110 to switch in/out at least one reactive resource of the reactive resources 121 for non-limiting example. The at least one output 116 may include at least one switch command for non-limiting example. The output interface 112 may be communicatively coupled to a system, such as a supervisory control and data acquisition (SCADA) system, for non-limiting example, or directly to a field device of the power grid 110. The output interface 112 may be a network interface or I/O interface, such as the network interface 912 and I/O interface 954 of FIG. 9, respectively, disclosed further below for non-limiting example. As such, the at least one output 116 may be output for real-time control or for manual control for non-limiting examples. The at least one output 116 may control switching in/out of at least one reactive resource, directly, or indirectly.

Continuing with reference to FIG. 1, in instances where the MILP optimization problem fails to solve, the decision-maker process 108 may be further configured to employ a fallback rule-based method, such as disclosed further below with regard to FIG. 3B, for maintaining voltage close to within the limits of interest.

Continuing with reference to FIG. 1, the output interface 112 may be configured to provide the at least one output 116 in a manner that enables real-time, multi-interval optimal reactive power dispatching in the power grid 110. The at least one output 116 may include at least one control command (not shown) configured to effectuate at least one field device (not shown) of the power grid 110 to switch in/out at least one reactive resource of the reactive resources 121. The at least one output 116 may include at least one representation (not shown) of one or more recommendations (not shown) for at least one field device (not shown) of the power grid 110 to switch in/out the at least one reactive resource of the reactive resources 121.

The results 114 may represent at least one control (not shown) for switching in/out the reactive resources 121. The monitoring process 106 may be further configured to periodically monitor at least one parameter 118 of the power grid 110 and identify at least one voltage (not shown) that is outside of the limits of interest at a respective point of interest in the power grid 110 based on the at least one parameter 118 monitored. The at least one parameter 118 monitored may include at least one measurement value sourced by at least one field device of the power grid 110 for non-limiting example.

The decision-maker process 108 may be further configured to converge on the at least one control (not shown) to resolve the at least one voltage identified as outside of the limits of interest. The decision-maker process 108 may be further configured to converge by periodically formulating and solving the representative MILP optimization problem and, in instances where the representative MILP optimization problem fails to solve, the decision-maker process 108 may be further configured to employ a fallback rule-based method (not shown) for maintaining voltage close to within the limits of interest.

The at least one control converged on by the decision-maker process 108 may represent at least one reactive resource to be switched in/out of the power grid 110 to resolve the at least one voltage outside of the limits of interest in the current time interval or at least one future time interval of the plural time intervals. The at least one output 116 may be based on the at least one control converged on by the decision-maker process 108. The results 114 may include the at least one control. The respective point of interest may be identified via an engineering process, for non-limiting example.

The decision-maker process 108 may be further configured to produce the results 114 based on voltage value (not shown), equipment status (not shown), network connectivity status (not shown), power delivery information (not shown), or other operative condition (not shown) for the power grid 110, or a combination thereof for non-limiting examples, in the current time interval and at least one future time interval of the plural time intervals. The decision-maker process 108 may be further configured to maintain voltages at points of interest in the power grid 110 to be within respective voltage ranges via switching of reactive resources 121 of the power grid and to minimize the reactive resource switching.

The monitoring process 106 may be further configured to identify the at least one voltage outside of the limits of interest based on a non-linear model (not shown) of an operative state (not shown) of the power grid 110. The decision-maker process 108 may be further configured to employ a linear approximation of a model of the operative state of the power grid 110. The monitoring process 106 and the decision-maker process 108 may be configured to work in concert over the plural time intervals to converge on controls (not shown) for switching in/out the reactive resources 121 to achieve the optimal reactive resource switching in the power grid 110. Further technical details are disclosed below.

Conventional methods formulate AC power flow and control decision(s) together as a large multi-variable mixed integer non-linear optimization problem, which is too complex to provide fast and reliable solutions for a real-time, closed-loop control application. As such, conventional methods have not been successfully implemented in power grid control rooms. Non-limiting advantages of an example embodiment disclosed herein include:

- Decouple the problems into two major parts: full AC power flow and MILP optimization. This significantly simplifies the problem resulting in a faster and more reliable solution and maintains sufficient accuracy suitable for real-time, closed-loop control.
- A fallback rule-based approach in case MILP optimization is infeasible.
- Interaction between calculated control and system response forms a robust feedback process to achieve optimal system operations.
- The control decision calculation and issuing of a field command may be accomplished by two asynchronously run periodic processes, namely the monitoring process 106 and decision-maker process 108, disclosed above with regard to FIG. 1.

With reference back to FIG. 1, the monitoring process 106 may start with a current system operating condition 119 of the power grid 110 provided by a real time state estimator (not shown), retrieve equipment outage, forecast loads, scheduled generation, set point values for a future time, solve full AC power flow, and store voltage violations, reactive resource in/out of service status, and the sensitivity of voltage values at key points to reactive resource reactive power. The system operating condition 119 may be provided to the decision-maker process 108. An example embodiment of the monitoring process 106 is disclosed below with regard to FIG. 2.

Figure 2:
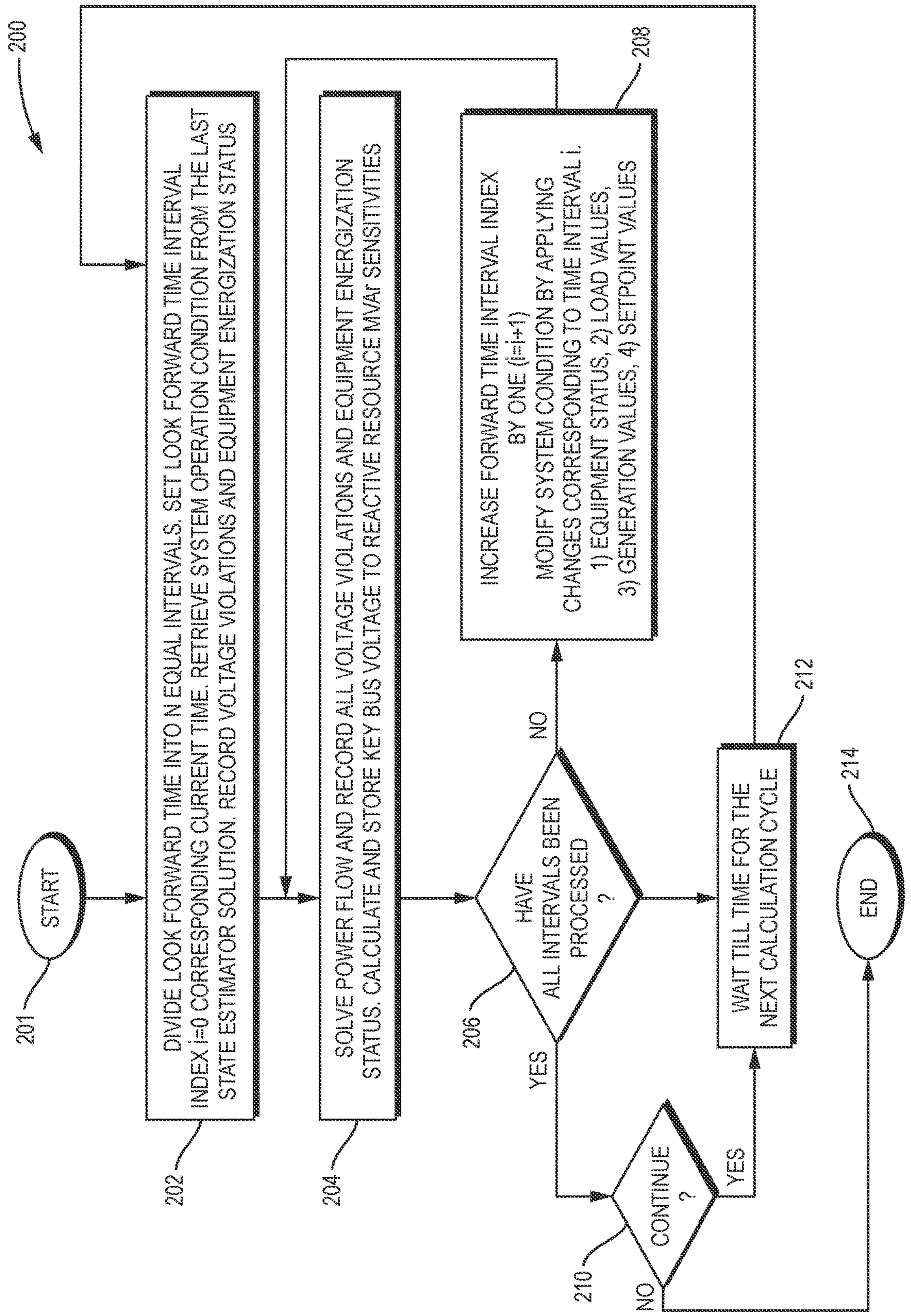
FIG. 2 is a flow diagram of an example embodiment of a monitoring method.

FIG. 2 is a flow diagram of an example embodiment of a monitoring method 200 that may be employed as the monitoring process 106 of FIG. 1, disclosed above, and referred to interchangeably herein as process A. Continuing with reference to FIG. 2, the monitoring method 200 (Process A) may involve periodic full power flow solutions for all forward (future) time intervals.

The monitoring method 200 may begin (201 and start with a current system operating condition of a power grid provided by a real time state estimator of the power grid for non-limiting example. The monitoring method may divide (202) look forward time into N equal time intervals, set a look forward time interval index i=0, corresponding to a current time, retrieve a system operating condition from a last state estimator solution, and record voltage violations and equipment energization status.

The monitoring method 200 may solve (204) power flow and record all voltage violations and equipment energization status, calculate and store key bus voltage to reactive resource reactive power sensitivities. The monitoring method 200 may check (206) whether all time intervals have been processed. If no, the monitoring method 200 may increase (208) the forward time interval index by one (i=i+1), modify the system operating condition by applying changes corresponding to the time interval i, such as: 1) equipment status, 2) load values, 3) generation values, 4) setpoint values, or a combination thereof for non-limiting examples, and proceed to again solve (204) power flow, as disclosed above. If, however, the check (206) is yes, the monitoring method 200 may check (210) for whether to continue. If yes, the monitoring method 200 may wait (212) until it's time for the next calculation cycle and then proceed to divide (202) as disclosed above. If, however, the check (210) for whether to continue yields no, the monitoring method 200 thereafter ends (214) in the example embodiment.

With reference back to FIG. 1, the decision-maker process 108, referred to interchangeably herein as Process B, may involve periodic control decision making and issuing of switch commands through a SCADA system for non-limiting example. The decision-maker process 108 (Process B) may formulate the core problem as MILP optimization, as disclosed by the MILP problem formulation disclosed by:

$$\min \sum_{r=1}^{N_r} \sum_{t=0}^{N_t} \left| K_r^t - K_r^{t-1} \right| \tag{1}$$

subject to:

$$V_{min}^t \le V^t \le V_{max}^t \text{ for all } t.$$

wherein:

r=reactive resource index, r=1, $N_r$;

t=time interval index, t=0, $N_t$, t=0 corresponds to current time;

$K_r^t \in \{0, 1\}$ = binary variable representing the status of controllable reactive resource $r$, at time interval $t$. $K_r^{-1}$ is the status of controllable reactive resource r at current system operating condition;

$V^t \in \mathbb{R}^{N_k} = V_0^t + S^t[Q^t - Q^{-1}]$, key point voltage vector at time interval t, $N_k$ is the total number of key points (points of interest);

$V_0^t \in \mathbb{R}^{N_k}$ = key point voltage vector at time interval $t$, before any reactive resource status change, as solved by Process $A$;

$S^t \in \mathbb{R}^{N_k \times N_r}$=key point voltage to reactive resource reactive power (capacitive) sensitivity matrix for time interval t as calculated by Process A;

$Q^t \in \mathbb{R}^{N_r}$=vector of reactive resource reactive power for time interval t; and reactive power is positive for capacitors and negative for reactors. For reactive resource r, $$Q_r^t = (K_r^t) \times B_r,$$

where $B_r$ is admittance of reactive resource r; and $Q^{-1} \in \mathbb{R}^{N_r}$=vector of reactive resource reactive power at the current real time operating condition.

Continuing with reference to FIG. 1, the decision-maker process 108 may determine in/out service status of controllable reactive resources in the power grid 110 as binary control variables. An objective of the decision-maker process 108 may be to minimize a total number of status changes of all controllable reactive resources of the power grid 110 over a time-period of interest. The decision-maker process 108 may employ constraints, such as all voltages at key points (points of interest) are to be within respective high and low limits. According to an example embodiment, decision-maker process 108 may employ a fallback rule-based method in case MILP optimization fails to solve, such as disclosed further below with regard to FIG. 3B. Continuing with reference to FIG. 1, the results 114 may cause the computer-based system 102 to issue a command via the output interface 112 to switch reactive resources 121 of the power grid 110 in or out or a combination (switching one or more reactive resources in while switching other reactive resources out). An example embodiment of the decision-maker process 108 is disclosed below with regard to FIG. 3A.

Figure 3A:
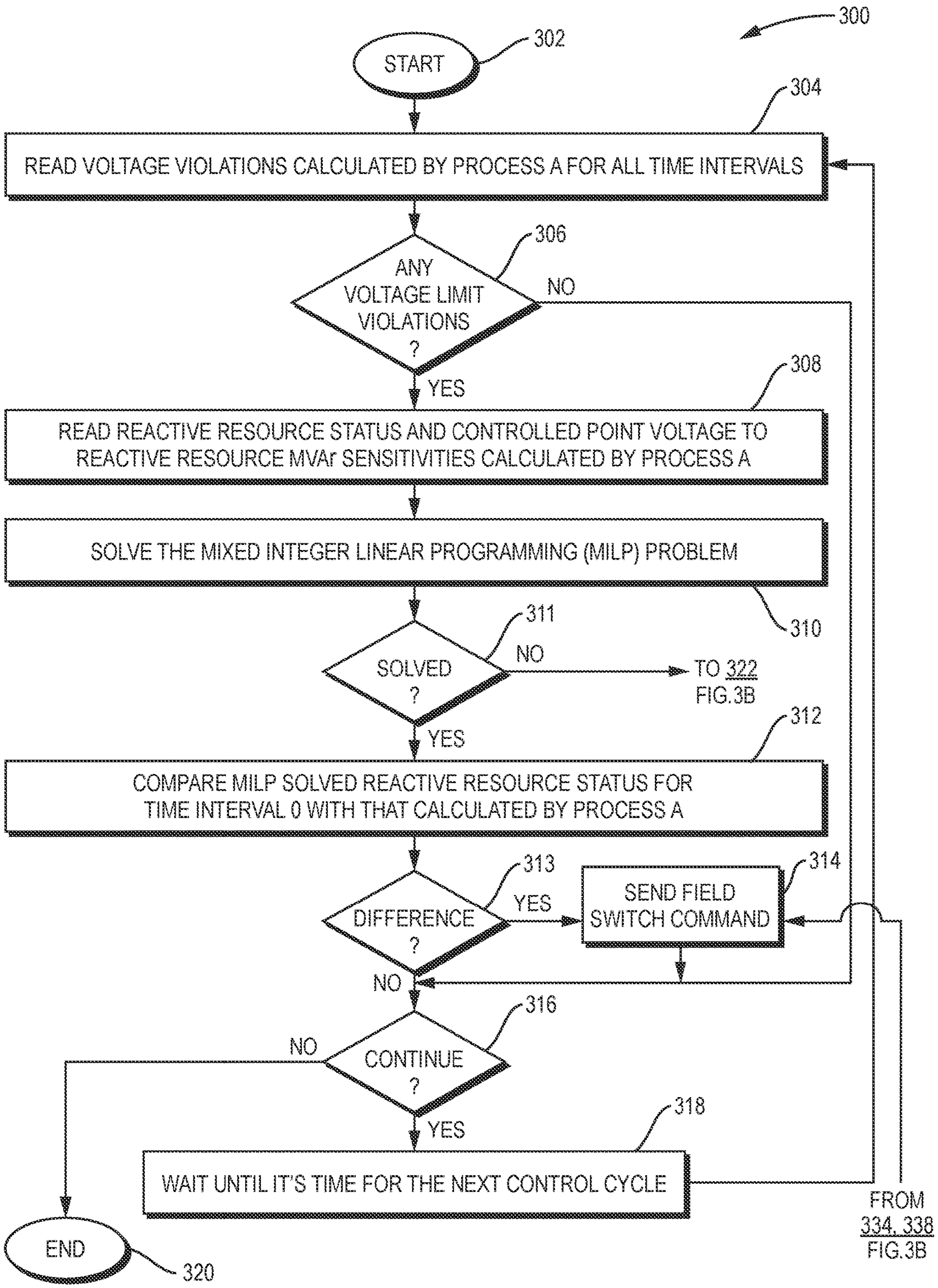
FIG. 3A is a flow diagram of an example embodiment of a decision-maker method.

FIG. 3A is a flow diagram of an example embodiment of a decision-maker method 300 that may be employed as the decision-maker process 108 of FIG. 1, disclosed above, and referred to interchangeably herein as process B. The example embodiment may be employed to perform a MILP-based control decision for switching in/out a reactive resource(s).

With reference to FIG. 3A, the decision-maker method 300 (Process B) begins (302) and may read (304) voltage violations calculated by process A, that is, the monitoring method 200 of FIG. 2, disclosed above, for all time intervals. Continuing with reference to FIG. 3A, the decision-maker method 300 may check (306) if there are any voltage limit violations. If no, the decision-maker method 300 may check (316) for whether to continue. If yes, the decision-maker method 300 may wait (318) until it's time for the next control cycle and then again read (304) voltage violations calculated by Process A (i.e., monitoring method 200) for all time intervals. If, however, the check (316) for whether to continue yields no, the decision-maker method 300 ends (320) in the example embodiment.

If, however, the check (306) for whether there are any voltage limit violations yields yes, the decision-maker method 300 proceeds to read (308) reactive resource status and controlled point voltage to reactive resource MVAr sensitivities calculated by process A. The decision-maker method 300 then attempts to solve (310) the MILP problem according to Eq. 1, disclosed above. The decision-maker method 300 determines (311) whether the MILP problem solved successfully. If yes, the decision-maker method 300 compares (312) the MILP solved reactive resource status for time interval 0 with that calculated by Process A (i.e., the monitoring method 200) and, if a check (313) for whether there is a difference is yes, the decision-maker method 300 may proceed to send (314) a field switch command, for example, to a SCADA system for non-limiting example, to switch in/out a reactive resource (meaning, switch in the reactive resource or switch out the reactive resource). In an event the check (313) for the difference is no, or if the decision-maker method 300 proceeds to send (314) the field switch command, the decision-maker method 300 may then check (316) for whether to continue, as disclosed above. If yes, the decision-maker method 300 may proceed as disclosed above. If no, the decision-maker method 300 ends (320) in the example embodiment.

In an event the decision-maker method 300 determines (311) that the MILP solution did not solve successfully, the decision-maker method 300 may proceed to use a fallback rule-based method (process) of FIG. 3B, disclosed below, to determine if and what field switch command should be issued by proceeding to select (322) the first time interval with at least one voltage violation, as disclosed below with regard to FIG. 3B.

Figure 3B:
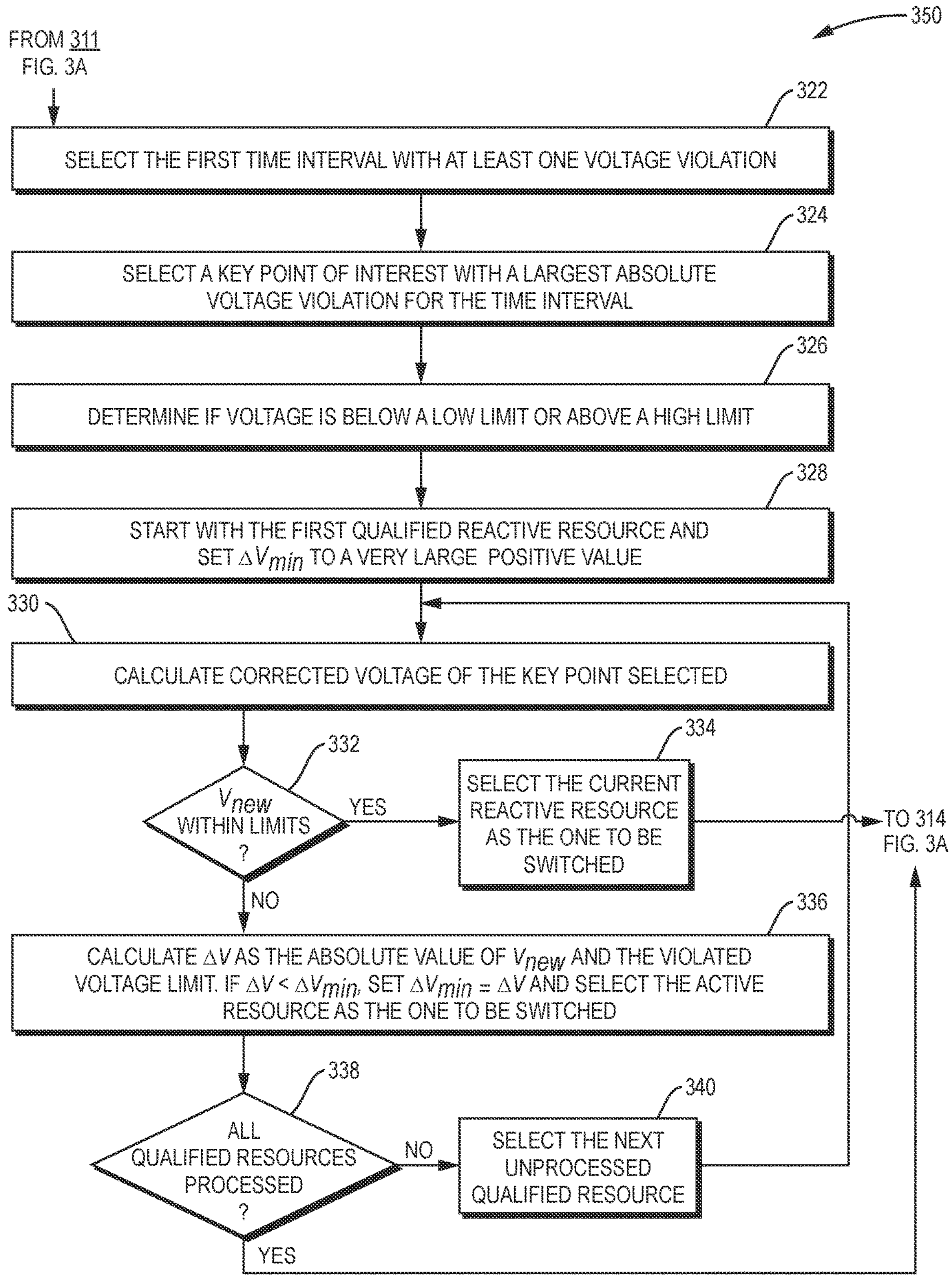
FIG. 3B is a flow diagram of an example embodiment of a fallback rule-based backup decision-maker method.

FIG. 3B is a flow diagram of an example embodiment of a fallback rule-based backup decision-maker method 350, referred to interchangeably herein as a fallback rule-based method. With reference to FIGS. 3A and 3B, the fallback rule-based backup decision-maker method 350 may select (322) the first time interval with at least one voltage violation if the decision-maker method 300 determines (311) that the MILP problem did not solve successfully. The fallback rule-based backup decision-maker method 350 may then select (324) a key point of interest with a largest absolute voltage violation for the time interval.

The fallback rule-based backup decision-maker method 350 then determines (326) if voltage at the key point of interest is below a low limit, in which case qualified reactive resources are either in-service reactors or out-of-service capacitors, or if the voltage is above a high limit, in which case qualified reactive resources are either in-service capacitors or out-of-service reactors.

The fallback rule-based backup decision-maker method 350 may proceed to start (328) with the first qualified reactive resource and set $\Delta V_{min}$ to a very large positive value, and then calculate (330) corrected voltage of the key point of interest selected at (324). Such corrected voltage may be calculated as:

$$V_{new} = V_0 \pm sQ \tag{2}$$

wherein:

$V_{new}$=point voltage including the effect of switching of the reactive resource;

$V_0$=point voltage without the effect of switching of the reactive resource, that is the solved voltage by Process A;

±, – if the switching is disconnecting reactive resource, + if the switching is connecting reactive resource;

s=sensitivity of point voltage to reactive power (capacitive) of the controllable reactive resource; and Q=nominal reactive power of the reactive resource, positive for capacitor and negative for reactor.

The fallback rule-based backup decision-maker method 350 may then check (332) if $V_{new}$ is within limits. If yes, the fallback rule-based backup decision-maker method 350 may select (334) the current reactive resource as the one to be switched and then proceed to send (314) the switch command, as disclosed above. If no, the fallback rule-based backup decision-maker method 350 may proceed to calculate (336) ΔV as the absolute value of $V_{new}$ and the violated voltage limit. If $\Delta V<\Delta V_{min}$, set $\Delta V_{min}=\Delta V$ and select the reactive resource as the one to be switched.

The fallback rule-based backup decision-maker method 350 may then check (338) if all qualified resources have been processed. If no, the fallback rule-based backup decision-maker method 350 may select (340) the next unprocessed qualified resource and calculate (330) corrected voltage as disclosed above. If the check (318) is yes, the fallback rule-based backup decision-maker method 350 may proceed to send (314) a switch command to switch in or out the selected reactive resource, as disclosed above.

Figure 4:
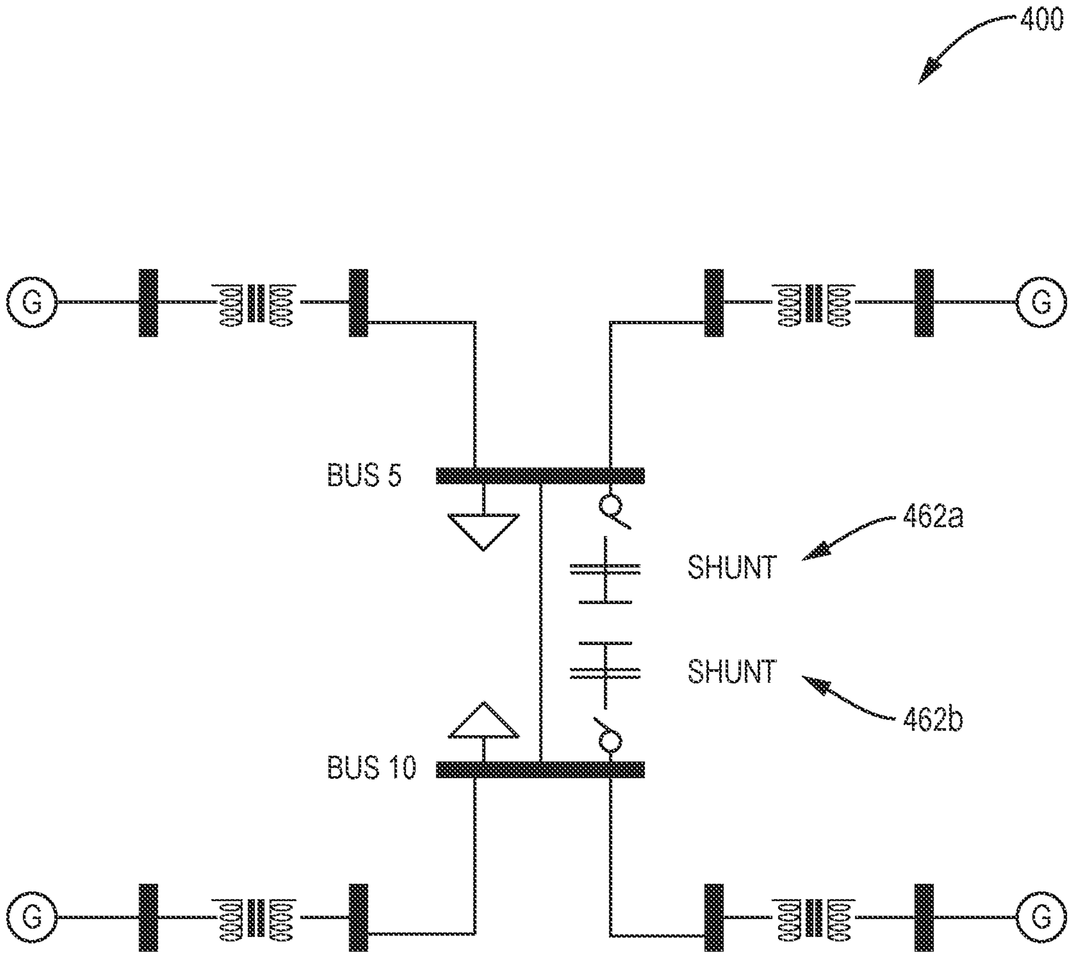
FIG. 4 is a schematic of a non-limiting example embodiment of a test system.

FIG. 4 is a schematic of a non-limiting example embodiment of a test system 400. In the non-limiting example embodiment, there are two buses, namely bus 5 and bus 10, which have been identified as key points of interest. Based on results of an example embodiment of a method disclosed herein (e.g., methods 200, 300, 350, 800), an example embodiment disclosed herein may send a command to switch in/out the shunt 462*a* and/or the shunt 462*b*, which are reactive resources in the non-limiting example embodiment.

Figure 5:
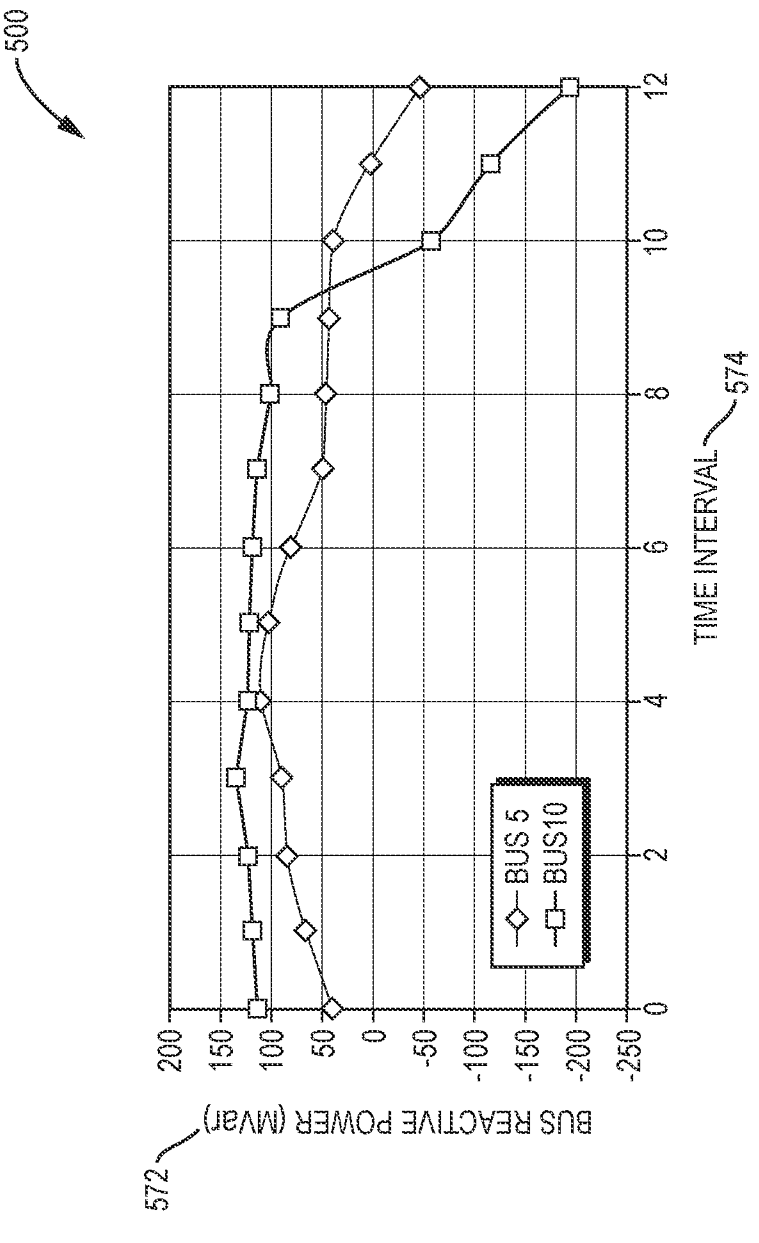
FIG. 5 is a plot of a non-limiting example embodiment of bus reactive power at different time intervals.

FIG. 5 is a plot 500 of a non-limiting example embodiment of bus reactive power 572 for a time interval 574 for the bus 5 and the bus 10 of FIG. 4, disclosed above, at different time intervals. With reference to FIG. 4 and FIG. 5, the shunts (462*a*, 462*b*) can be switched in/out to add or subtract reactive power to affect voltage of the bus 5 and the bus 10 over time. It should be understood that the plot 500 includes experimental results for non-limiting example.

Figure 6:
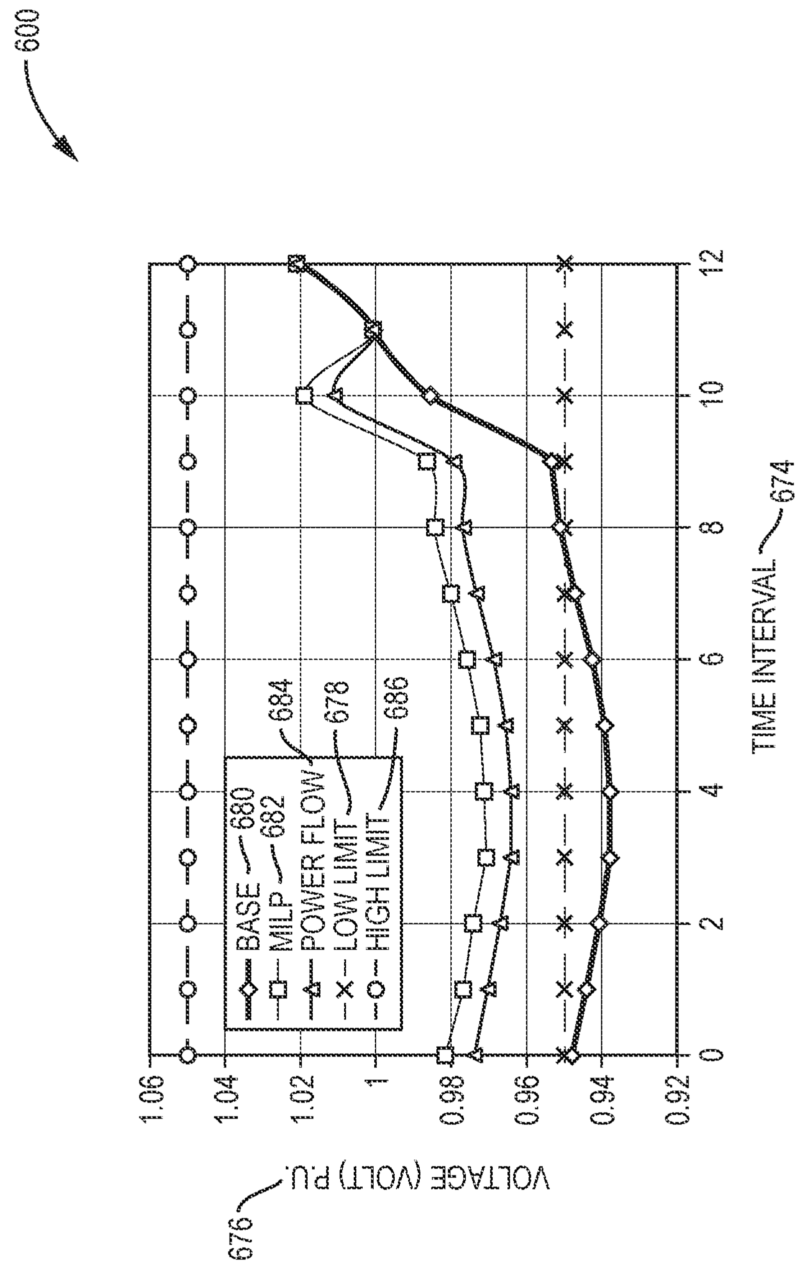
FIG. 6 a plot of a non-limiting example embodiment of a voltage of a bus of FIG. 4.

FIG. 6 is a plot 600 of a non-limiting example embodiment of a voltage 676 of the bus 10 of FIG. 4 for a time interval 674. With reference to FIG. 4 and FIG. 6, the plot 600 includes a low limit 678 and a high limit 686 that is allowed (accepted) for the bus 10. In the plot 600, the voltage 676 at the bus 10 is below the low limit 678 for some time intervals if no shunt is switched. The plot 600 further includes plots of the voltage 676 at the bus 10 for the time interval 674 a) if no switching action is taken, that is, the base 680 plot, b) if the MILP solution is employed, that is, the MILP 682 plot, and c) if the power flow solution is employed, that is, the power flow 684 plot. The power flow solution employs a complex non-linear model. The plot 600 illustrates that with the optimal shunt switching solution, both a linear solution and full power flow solution maintain the bus 10 voltage within the limits, that is, within the low limit 678 and high limit 686. The optimal reactive power dispatch is illustrated in FIG. 7, disclosed below.

Figure 7:
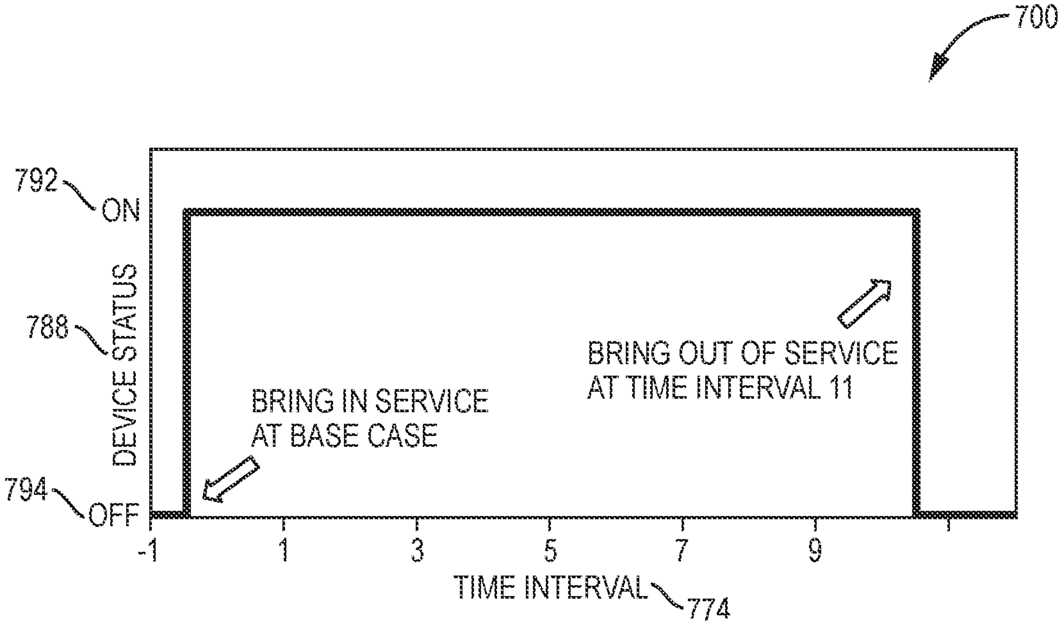
FIG. 7 a plot of a non-limiting example embodiment of a shunt status of a bus of FIG. 4.

FIG. 7 is a plot 700 of a non-limiting example embodiment of a shunt status of the bus 10 of FIG. 4, disclosed above. The plot 700 plots the device status 788 of a shunt of the bus 10 at a time interval 774, wherein the device status 788 is ON 792 or OFF 794. Such device status 788 is for optimal reactive power dispatch.

Figure 8:
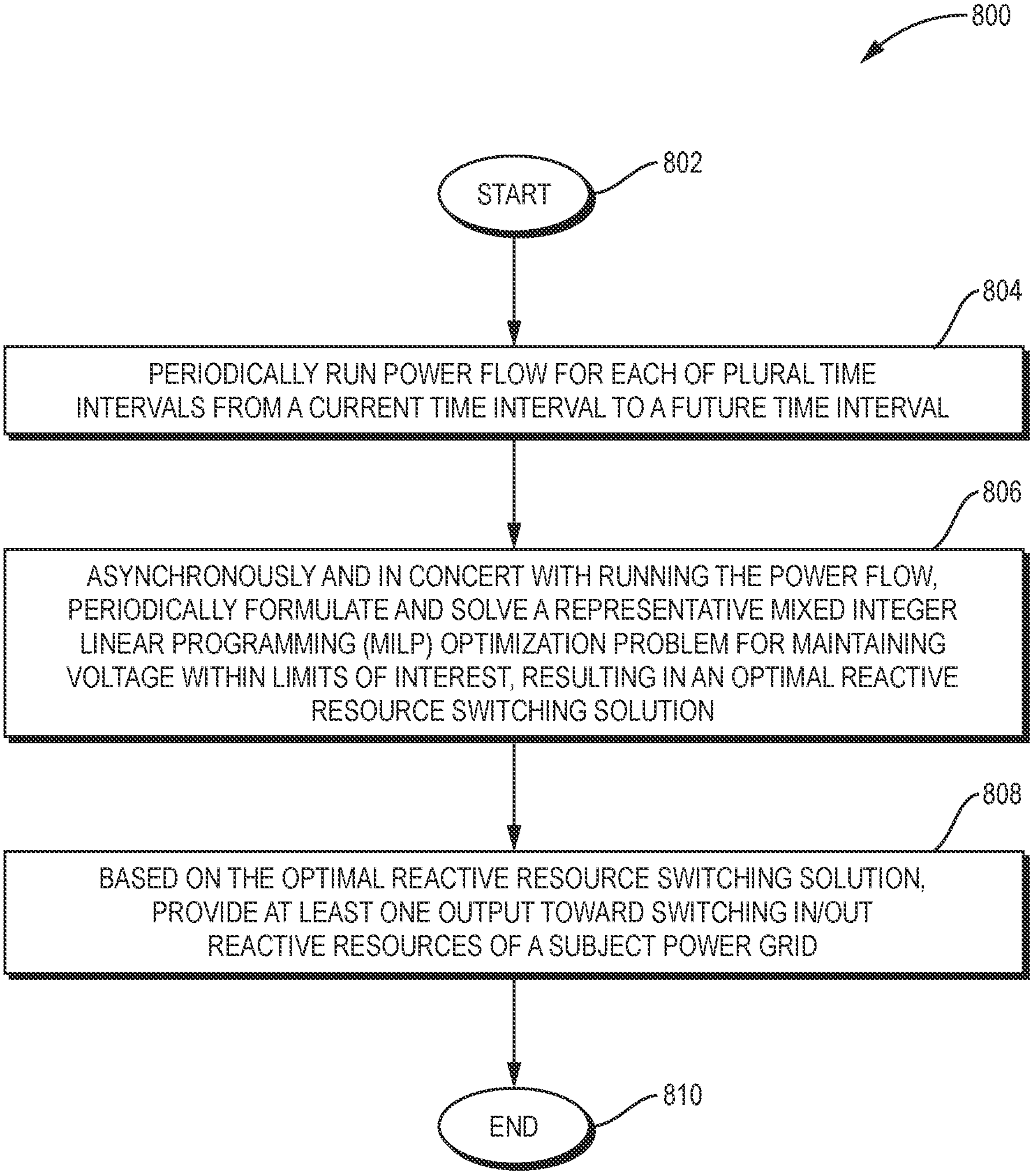
FIG. 8 is a flow diagram of an example embodiment of a computer-implemented method for power grid reactive resource switching.

FIG. 8 is a flow diagram of an example embodiment of a computer-implemented method 800 for power grid reactive resource switching. The computer-implemented method begins (802) and comprises, periodically running power flow for each of plural time intervals from a current time interval to a future time interval (804). The computer-implemented method 800 further comprises asynchronously, and in concert with running the power flow, periodically formulating and solving a representative mixed integer linear programming (MILP) optimization problem for maintaining voltage within limits of interest, resulting in an optimal reactive resource switching solution (806). The computer-implemented method 800 further comprises, based on the optimal reactive resource switching solution, providing at least one output toward switching in/out reactive resources (i.e., switching in one or more reactive resources and/or switching out one or more other reactive resources) of a subject power grid (808). The computer-implemented method 800 thereafter ends (810) in the example embodiment.

In instances where the MILP optimization problem fails to solve, the computer-implemented method may further comprise employing a fallback rule-based method for maintaining voltage close to within the limits of interest.

The providing of the at least one output may be in a manner that enables real-time, multi-interval optimal reactive power dispatching in the subject power grid. The at least one output may include at least one control command and the providing may include transmitting the at least one control command to effectuate at least one field device of the subject power grid to switch in/out at least one reactive resource of the reactive resources.

The at least one output may include at least one representation of one or more recommendations for at least one field device of the subject power grid to switch in/out at least one reactive resource of the reactive resources and the providing may include outputting the at least one representation to a display device, electronic file, or a combination thereof.

The optimal reactive resource switching solution may represent at least one control for switching in/out the reactive resources and the computer-implemented method may further comprise periodically monitoring at least one parameter of the subject power grid and identifying at least one voltage outside the limits of interest at a respective point of interest in the subject power grid based on the at least one parameter monitored. The computer-implemented method may further comprise converging on the at least one control to resolve the at least one voltage identified as outside of the limits of interest by periodically formulating and solving the representative MILP optimization problem and, in the instances where the representative MILP optimization problem fails to solve, employing a fallback rule-based method for maintaining voltage close to within the limits of interest. Monitoring the at least one parameter may include monitoring at least one measurement value sourced by at least one field device of the subject power grid.

The at least one control converged on by the decision-maker process may represent at least one reactive resource to be switched in/out of the subject power grid to resolve the at least one voltage outside of the limits of interest in a present interval or at least one future time interval of the plural time intervals. The at least one output may be based on the at least one control converged on and the computer-implemented method may further comprise identifying the respective point of interest via an engineering process, for non-limiting example.

The computer-implemented method may further comprise identifying the at least one voltage as being outside of the limits of interest based on a non-linear model of an operative state of the subject power grid.

The computer-implemented method may further comprise employing a linear approximation of a model of an operative state of the subject power grid.

The computer-implemented method may further comprise achieving the optimal reactive resource switching solution over the plural time intervals by converging on controls for switching in/out the reactive resources. The computer-implemented method may further comprise employing voltage value, equipment status, network connectivity status, power delivery information, or other operative condition for the subject power grid, or a combination thereof, in the current time interval and at least one future time interval of the plural time intervals to achieve the optimal reactive resource switching solution. The optimal reactive resource switching solution may include maintaining voltages at points of interest in the subject power grid to be within respective voltage ranges via switching of reactive resources of the subject power grid and minimizing the reactive resource switching.

Figure 9:
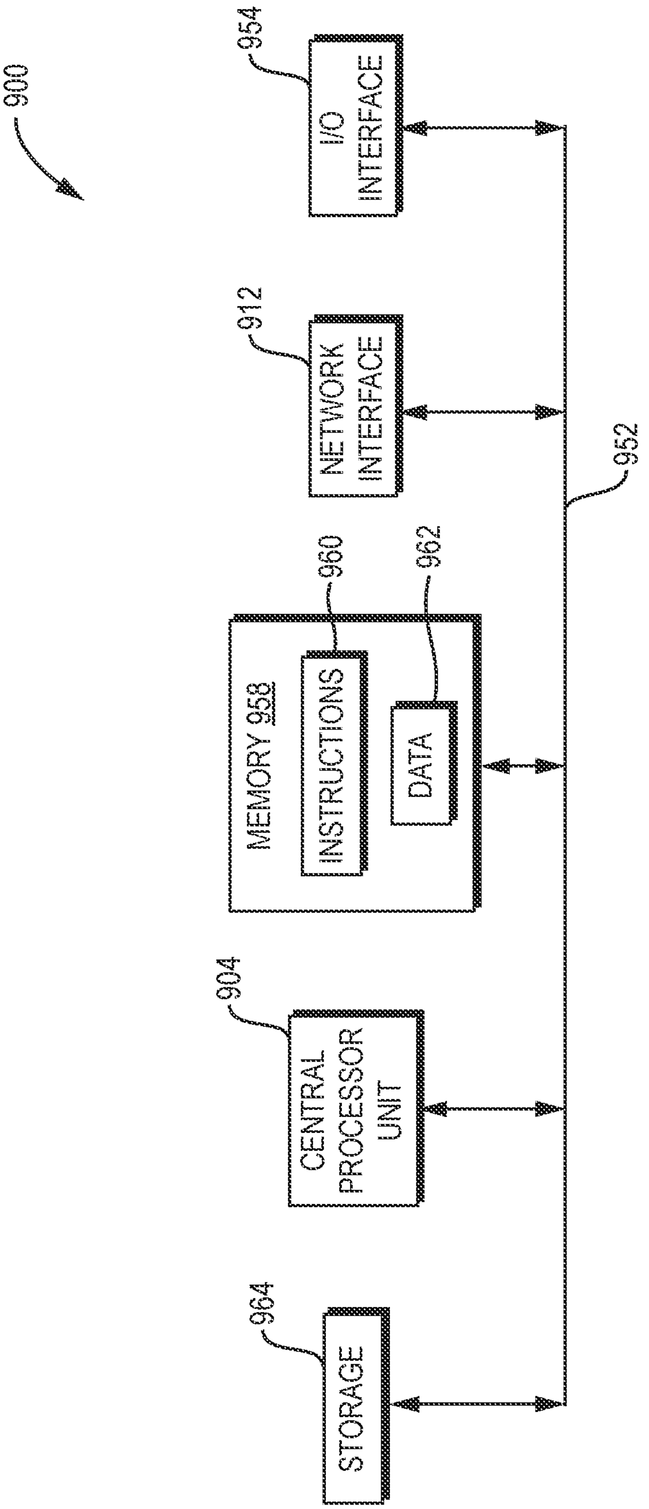
FIG. 9 is a block diagram of an example internal structure of a computer optionally within an embodiment disclosed herein.

FIG. 9 is a block diagram of an example of the internal structure of a computer 900 in which various embodiments of the present disclosure may be implemented. The computer 900 contains a system bus 952, where a bus is a set of hardware lines used for data transfer among the components of a computer or digital processing system. The system bus 952 is essentially a shared conduit that connects different elements of a computer system (e.g., processor, disk storage, memory, input/output ports, network ports, etc.) that enables the transfer of information between the elements. Coupled to the system bus 952 is an I/O device interface 954 for connecting various input and output devices (e.g., keyboard, mouse, display monitors, printers, speakers, etc.) to the computer 900. A network interface 912 allows the computer 900 to connect to various other devices attached to a network (e.g., global computer network, wide area network, local area network, etc.). Memory 958 provides volatile or non-volatile storage for computer software instructions 960 and data 962 that may be used to implement embodiments (e.g., methods 200, 300, 400, 350, and 800) of the present disclosure, where the volatile and non-volatile memories are examples of non-transitory media. Disk storage 964 provides non-volatile storage for computer software instructions 960 and data 962 that may be used to implement embodiments (e.g., methods 200, 300, 400, 350, and 800) of the present disclosure. A central processor unit (CPU) 904 is also coupled to the system bus 952 and provides for the execution of computer instructions.

As used herein, the term "interface" may refer to any hardware, software, firmware, electronic control component, processing logic, individually or in any combination, an electronic circuit and/or other suitable components that provide the described functionality.

Example embodiments disclosed herein may be configured using a computer program product; for example, controls may be programmed in software for implementing example embodiments. Further example embodiments may include a non-transitory, computer-readable medium containing instructions that may be executed by a processor, and, when loaded and executed, cause the processor to complete methods described herein. It should be understood that elements of the block and flow diagrams may be implemented in software or hardware, such as via one or more arrangements of circuitry of FIG. 9, disclosed above, or equivalents thereof, firmware, a combination thereof, or other similar implementation determined in the future.

In addition, the elements of the block and flow diagrams described herein may be combined or divided in any manner in software, hardware, or firmware. If implemented in software, the software may be written in any language that can support the example embodiments disclosed herein. The software may be stored in any form of computer readable medium, such as random-access memory (RAM), read-only memory (ROM), compact disk read-only memory (CD-ROM), and so forth. In operation, a general purpose or application-specific processor or processing core loads and executes software in a manner well understood in the art. It should be understood further that the block and flow diagrams may include more or fewer elements, be arranged or oriented differently, or be represented differently. It should be understood that implementation may dictate the block, flow, and/or network diagrams and the number of block and flow diagrams illustrating the execution of embodiments disclosed herein.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed or contemplated herein or in the drawings being filed herewith.

What is claimed is:

1. A computer-based system for power grid reactive resource switching, the computer-based system comprising:

(a) at least one processor configured to execute, asynchronously, a monitoring process and decision-maker process working in concert resulting in optimal reactive resource switching in a power grid, the monitoring process configured to periodically run power flow for each of plural time intervals from a current time interval to a future time interval, and the decision-maker process configured to periodically formulate and solve a representative mixed integer linear programming (MILP) optimization problem over the plural time intervals for maintaining voltage within limits of interest; and (b) an output interface responsive to results of the decision-maker process, and communicatively coupled to provide at least one output toward the power grid switching in/out reactive resources, the at least one output provided based on the results, wherein the results represent at least one control for switching in/out the reactive resources and wherein:

the monitoring process is further configured to periodically monitor at least one parameter of the power grid and identify at least one voltage outside the limits of interest at a respective point of interest in the power grid based on the at least one parameter monitored; and the decision-maker process is further configured to converge on the at least one control to resolve the at least one voltage identified as outside of the limits of interest, the decision-maker process further configured to converge by periodically formulating and solving the representative MILP optimization problem and, in instances where the representative MILP optimization problem fails to solve, employing a fallback rule-based method for maintaining voltage close to within the limits of interest.

2. The computer-based system of claim 1, wherein, in instances where the MILP optimization problem fails to solve, the decision-maker process is further configured to employ a fallback rule-based method for maintaining voltage close to within the limits of interest.

3. The computer-based system of claim 1, wherein the output interface is configured to provide the at least one output in a manner that enables real-time, multi-interval optimal reactive power dispatching in the power grid.

4. The computer-based system of claim 1, wherein the at least one output includes at least one control command configured to effectuate at least one field device of the power grid to switch in/out at least one reactive resource of the reactive resources.

5. The computer-based system of claim 1, wherein the at least one output includes at least one representation of one or more recommendations for at least one field device of the power grid to switch in/out at least one reactive resource of the reactive resources.

6. The computer-based system of claim 1, wherein the at least one output is based on the at least one control converged on by the decision-maker process.

7. The computer-based system of claim 1, wherein the monitoring process is further configured to identify the at least one voltage outside of the limits of interest based on a non-linear model of an operative state of the power grid.

8. The computer-based system of claim 1, wherein the at least one control converged on by the decision-maker process represents at least one reactive resource to be switched in/out of the power grid to resolve the at least one voltage outside of the limits of interest in the current time interval or at least one future time interval of the plural time intervals.

9. The computer-based system of claim 1, wherein the at least one parameter monitored includes at least one measurement value sourced by at least one field device of the power grid.

10. The computer-based system of claim 1, wherein the decision-maker process is further configured to employ a linear approximation of a model of an operative state of the power grid.

11. The computer-based system of claim 1, wherein the monitoring process and the decision-maker process are configured to work in concert over the plural time intervals to converge on controls for switching in/out the reactive resources to achieve the optimal reactive resource switching in the power grid.

12. The computer-based system of claim 1, wherein the decision-maker process is further configured to produce the results based on voltage value, equipment status, network connectivity status, power delivery information, or other operative condition for the power grid, or a combination thereof, in the current time interval and at least one future time interval of the plural time intervals.

13. The computer-based system of claim 1, wherein the decision-maker process is further configured to maintain voltages at points of interest in the power grid to be within respective voltage ranges via switching of reactive resources of the power grid and to minimize the reactive resource switching.

14. A computer-implemented method for power grid reactive resource switching, the computer-implemented method comprising:

periodically running power flow for each of plural time intervals from a current time interval to a future time interval;

asynchronously and in concert with running the power flow, periodically formulating and solving a representative mixed integer linear programming (MILP) optimization problem for maintaining voltage within limits of interest, resulting in an optimal reactive resource switching solution; and based on the optimal reactive resource switching solution, providing at least one output toward switching in/out reactive resources of a subject power grid, wherein the optimal reactive resource switching solution represents at least one control for switching in/out the reactive resources and wherein the computer-implemented method further comprises:

periodically monitoring at least one parameter of the subject power grid and identifying at least one voltage outside the limits of interest at a respective point of interest in the subject power grid based on the at least one parameter monitored; and converging on the at least one control to resolve the at least one voltage identified as outside of the limits of interest by periodically formulating and solving the representative MILP optimization problem and, in the instances where the representative MILP optimization problem fails to solve, employing a fallback rule-based method for maintaining voltage close to within the limits of interest.

15. The computer-implemented method of claim 14, wherein, in instances where the MILP optimization problem fails to solve, the computer-implemented method further comprises employing a fallback rule-based method for maintaining voltage close to within the limits of interest.

16. The computer-implemented method of claim 14, wherein the providing is in a manner that enables real-time, multi-interval optimal reactive power dispatching in the subject power grid.

17. The computer-implemented method of claim 14, wherein the at least one output includes at least one control command and wherein the providing includes transmitting the at least one control command to effectuate at least one field device of the subject power grid to switch in/out at least one reactive resource of the reactive resources.

18. The computer-implemented method of claim 14, wherein the at least one output includes at least one representation of one or more recommendations for at least one field device of the subject power grid to switch in/out at least one reactive resource of the reactive resources and wherein the providing includes outputting the at least one representation to a display device, electronic file, or a combination thereof.

19. The computer-implemented method of claim 14, wherein the at least one output is based on the at least one control converged on.

20. The computer-implemented method of claim 14, further comprising identifying the at least one voltage as being outside of the limits of interest based on a non-linear model of an operative state of the subject power grid.

21. The computer-implemented method of claim 14, wherein the at least one control converged on by the decision-maker process represents at least one reactive resource to be switched in/out of the power grid to resolve the at least one voltage outside of the limits of interest in the current time interval or at least one future time interval of the plural time intervals.

22. The computer-implemented method of claim 14, wherein monitoring the at least one parameter includes monitoring at least one measurement value sourced by at least one field device of the subject power grid.

23. The computer-implemented method of claim 14, further comprising employing a linear approximation of a model of an operative state of the subject power grid.

24. The computer-implemented method of claim 14, further comprising achieving the optimal reactive resource switching solution over the plural time intervals by converging on controls for switching in/out the reactive resources.

25. The computer-implemented method of claim 14, further comprising employing voltage value, equipment status, network connectivity status, power delivery information, or other operative condition for the subject power grid, or a combination thereof, in the current time interval and at least one future time interval of the plural time intervals to achieve the optimal reactive resource switching solution.

26. The computer-implemented method of claim 14, wherein the optimal reactive resource switching solution includes maintaining voltages at points of interest in the subject power grid to be within respective voltage ranges via switching of reactive resources of the subject power grid and minimizing the reactive resource switching.

27. A non-transitory computer-readable medium for power grid reactive resource switching, the non-transitory computer-readable medium having encoded thereon a sequence of instructions which, when loaded and executed by at least one processor, causes the at least one processor to:

periodically run power flow for each of plural time intervals from a current time interval to a future time interval;

asynchronously and in concert with running the power flow, periodically formulate and solve a representative mixed integer linear programming (MILP) optimization problem for maintaining voltage within limits of interest, resulting in an optimal reactive resource switching solution; and based on the optimal reactive resource switching solution, provide at least one output toward switching in/out reactive resources of a subject power grid, wherein the optimal reactive resource switching solution represents at least one control for switching in/out the reactive resources and wherein the computer-implemented method further comprises:

periodically monitoring at least one parameter of the subject power grid and identifying at least one voltage outside the limits of interest at a respective point of interest in the subject power grid based on the at least one parameter monitored; and converging on the at least one control to resolve the at least one voltage identified as outside of the limits of interest by periodically formulating and solving the representative MILP optimization problem and, in the instances where the representative MILP optimization problem fails to solve, employing a fallback rule-based method for maintaining voltage close to within the limits of interest.

* * * * *